Feb. 27, 1962 J. A. DICKERSON 3,023,404

MAGNETIC DRUM HEAD POSITIONING SYSTEM

Filed Dec. 31, 1957

Inventor
Jack A. Dickerson
by Edgar H. Kent Atty.

United States Patent Office 3,023,404

Patented Feb. 27, 1962

3,023,404

MAGNETIC DRUM HEAD POSITIONING SYSTEM

Jack A. Dickerson, Hyde Park, N.Y., assignor to International Business Machines Corporation, New York, N.Y., a corporation of New York Filed Dec. 31, 1957, Ser. No. 706,513
5 Claims. (Cl. 340—174.1)

This invention relates to the storage of information on magnetic drums of the type often used in data processing machines, and more particularly it relates to the positional control of the magnetic drum heads.

In the application of magnetic drums to the process of storing and retrieving information, oftentimes certain advantages derive from the use of a positional control system for the magnetic drum heads whereby, for example, the information channels that are serviced by the respective heads may be operatively coupled to selected tracks on the drum chosen from among a total number of tracks which greatly exceeds the number of heads. Conventionally, the heads are moved as a unit in and out of registry with the tracks and to this end there is generally provided a head supporting bar in the nature of a carriage whose axial position with respect to the drum may be varied in a step-wise manner. To the extent that such positional adjustments of the head bar are not precisely made, the head will be imperfectly registered with the predefined tracks and as a result, old information will not be properly erased in the process of writing new information. This causes the tracks to become fuzzy, or in other words, the information stored therein is not clearly defined, which may make it difficult, if not impossible, accurately to reproduce the information when it is called for. With the trend toward narrower and narrower tracks so that more information may be packed on a given size drum, the degree of precision required in the head positioning process has been greatly increased. This has made it a problem to provide a suitable positional control system for the heads.

According to the invention, this problem is overcome through the use of certain tracks of signals on the drum whose sole function it is to provide position signals indicative of the positional correlation between the drum heads and their associated drum. The number of these positioning tracks corresponds to the number of optional positions into which the heads are to be moved, and the tracks are so spaced that for any selected position of the heads, one of the tracks will be in position to be sensed by a pair of suitable auxiliary transducing heads. Any small positional error that may exist is reflected in the amplitude and sense of the position signals as reproduced by the auxiliary heads and it is on this basis that an appropriate "vernier" correction is made. Positional errors arising from bearing play are eliminated according to the invention since it is the positional relation between the operative track of position signals and the auxiliary reproducing heads that is controlling, and these auxiliary heads are rigidly mounted on the head supporting bar with all the other heads serving the information channels. In other words, the drum and its associated head bar are directly related according to the invention as contrasted with the systems of the prior art wherein no provision exists for sensing and correcting for axial shifts in the position of the drum.

An object of the present invention, therefore, is to provide a more precise positional control system for magnetic heads whereby desired positional adjustments are achieved with great accuracy.

It is a further object of the invention to provide a positional control of the above-mentioned character which is relatively fast acting so as to enable the heads to be shifted into and out of registry with predefined tracks without introducing appreciable delays in the process of storing and retrieving information.

The novel features of the invention together with further objects and advantages thereof will become more readily apparent from the illustrative embodiment of the invention shown in the drawing and described in the following.

Figures 1, 2:
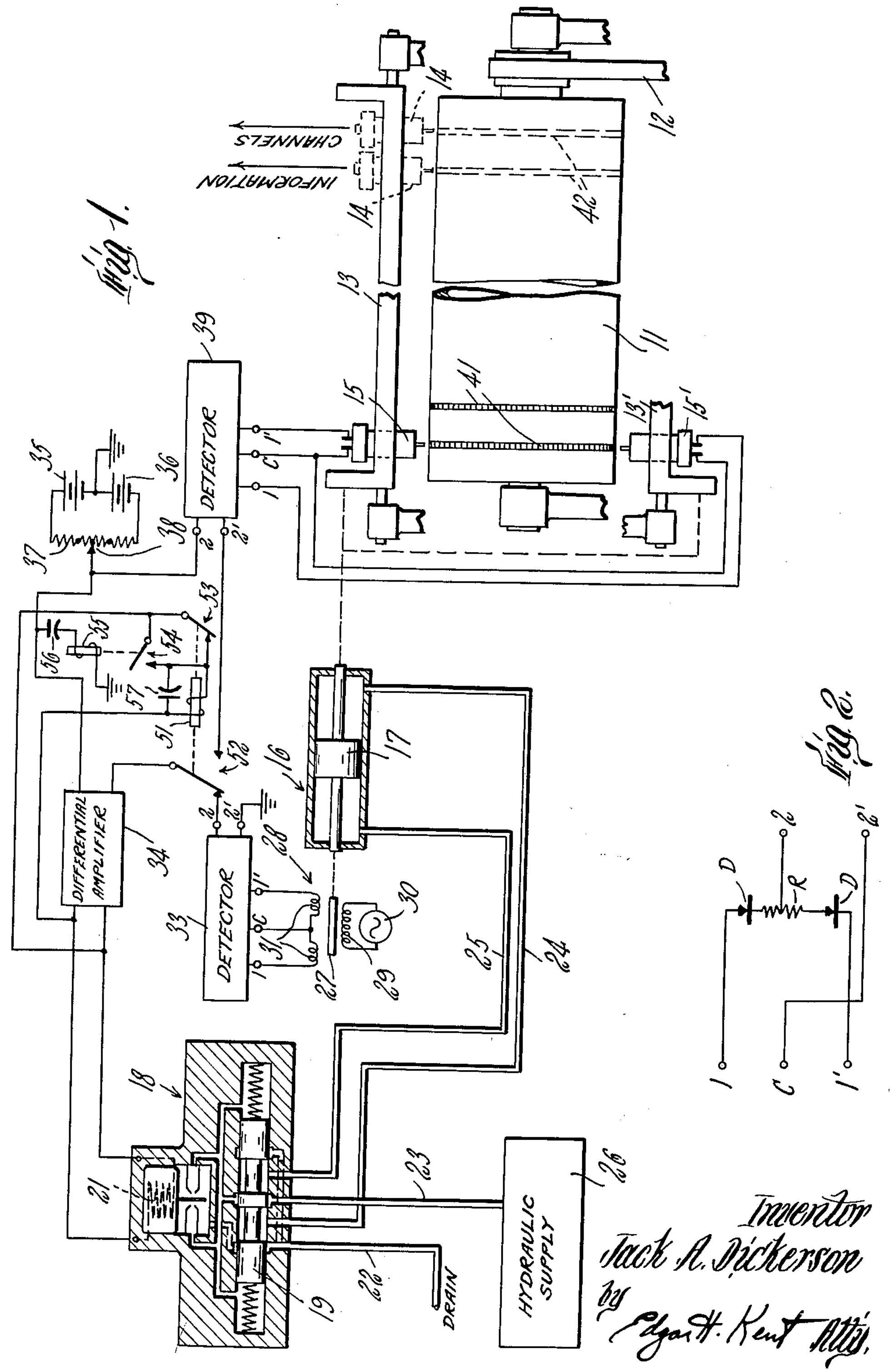
FIG. 1 is a schematic diagram of the illustrative embodiment.
FIG. 2 is a schematic diagram of the detectors employed in the illustrative embodiment.

With reference now to FIG. 1, the numeral 11 designates a magnetic drum driven by a pulley belt 12, and the numeral 13 designates a head supporting member or bar on which the transducing heads are mounted. Heads 14 are illustrative of those heads which service the various information channels through which information is passed in the process of reading and writing on the drum 11, and heads 15 and 15' are the aforementioned auxiliary read heads whose function and mode of operation will be discussed in detail hereinafter.

The head bar comprising members 13, 13' is mounted so that it may be moved axially with respect to the drum 11 and to produce such axial movement there is provided a hydraulic actuator 16 including a piston 17 which is controlled by an electro-hydraulic servo valve 18. One type of valve that has been found to work well in this environment is the two stage flutter type (such as Moog valve Model No. 1442A) wherein the valve spool 19 is itself hydraulically actuated by the control element 21. The valve and the piston are double acting, so that in addition to a drain line 22 and a supply line 23, the valve has a pair of power output lines 24 and 25 for connection to the piston. The supply line 23 is connected to a suitable source of hydraulic fluid 26 whose pressure, as is well known, must be closely regulated. A source capable of supplying ten gallons of fluid per minute at a pressure of three thousand pounds per square inch is entirely adequate for most present day drum systems. It will be appreciated, however, that this rating may vary considerably depending upon the size of the head bar, the extent of movement required therefor, and so forth.

There is also connected to the piston 17, the armature 27 of a linear differential transformer 28 having a primary winding 29 whose coupling to a pair of secondary windings 31 is dependent upon the lineal position of the armature. Primary winding 29 is energized by a suitable source of alternating current 30 and the secondary windings 31 are connected to a detector 33. As shown in FIG. 2 the detector 33 (and also detector 39 hereinafter) may conveniently comprise a pair of diodes D connected in series across input terminals 1, 1' by a resistor R. The output terminals 2, 2' are connected to the midpoint of the resistor R, and to a common input terminal C, respectively. Terminal C corresponds to the common ends of the secondary windings 31 of the transformer 28, and terminals 1, 1 correspond to the free ends of the windings as illustrated in FIG. 1. The function of detector 33 is to provide a direct current output voltage to represent the magnitude and phase of the alternating current output signal from the secondary windings as determined by the position of the armature 27. In particular, the phase of the output signal from the transformer will have one of two opposite values depending upon the direction of the displacement of the armature 27 with respect to a predetermined neutral position, and this phase difference is reflected in the polarity of the direct current output voltage from the detector 33. The extent of the displacement of the armature determines the magnitude of the output voltage with respect to a common point or ground.

To initiate a re-positioning operation, that is to produce a selected change in the position of the head bar, there is provided a source of reference voltage whose value is selectively variable in a stepwise manner, and in both positive and negative directions with respect to ground. Such a source has been represented in the drawing by a pair of batteries 35 and 36 connected in series aiding relation across a suitable voltage dividing circuit and having a common junction connected to ground. The voltage dividing circuit is formed with a series of resistance sections 37, whose junctions are connected to the fixed terminals of a tap switch 38. The movable arm of the tap switch 38 is directly connected to one of the input terminals of a differential amplifier 34 which has its other input terminal selectively connected to the ungrounded output terminal of detector 33. In this way, the differential amplifier is adapted to respond to the difference between the reference voltage and the output voltage from the detector. The output terminals of the differential amplifier are connected to the control winding 21 of the valve 18.

Alternatively, the input terminals to the differential amplifier are adapted to be selectively connected to the output terminals of a detector 39 which has as its source of input signals the auxiliary read heads 15 and 15'. These read heads are connected in series opposing relation to one another in like manner as the secondary windings of transformer 27.

The signals that are sensed by the read heads are stored on the drum in predefined tracks 41, the number and spacing of the tracks corresponding to the number and spacing of optional positions to which it is desired to move the information heads 14. A write head, not shown, may be permanently mounted on the head bar to produce the tracks 41 initially.

By way of example, the system according to the invention has been applied to a two-foot long drum having 4,800 information tracks with one information head for each fifty tracks. This means that the head bar was adapted to assume any one of fifty optional positions in order to bring all of the tracks into play, and that fifty positioning tracks were required so that one of them would always be in registry with the heads 15 and 15' whenever the heads 14 were approximately positioned with respect to selected ones of the tracks 42. The form of the signals stored in the tracks 41 is immaterial as regards the principle of the invention but it is important that the signals in each track be substantially alike. The signals may comprise a succession of pulses in the nature of ones as they are known in the computer art, for example.

The switching arrangement whereby the aforementioned selective connections are made to the input terminals of the differential amplifier is seen to include a relay coil 51 for actuation of single-pole, double-throw switch contacts 52, and single-pole, single-throw switch contacts 53. The movable contact of switch 52 is connected to one of the input terminals of the differential amplifier 34 and the fixed contacts are connected to respective output terminals of the detectors 33 and 39. Switch 53, on the other hand, has a fixed contact connected to one end of the relay coil 51 and a movable contact connected to one of the output terminals of the differential amplifier. The other end of the relay coil 51 is connected directly to the other of the output terminals of the differential amplifier and a capacitor 57 is connected across the relay coil. Paralleling the switch contacts 53 are switch contacts 54 actuated by a relay coil 55. Coil 55 is coupled to the reference voltage source, that is between the movable arm of tap switch 38 and ground, through a capacitor 56. If desired suitable trigger circuits may be employed in conjunction with the relays to increase the sensitivity of the system.

In operation, the positional control of the invention depends for its precision upon variations that occur in the amplitudes of the signals from the heads 15 and 15' when the heads are moved axially with respect to a selected one of the tracks 41. On the other hand, variations in the output signal from the linear differential transformer 28 that are produced by the piston 17, serve as a basis for a coarse adjustment of the head bar sufficient to bring the selected one of the positioning tracks 41 into operative registry with the heads 15 and 15'.

More particularly, if it be assumed that heads are initially in the position shown with respect to the drum, and it is desired to move them laterally to the right by one step, there will be provided a corresponding one step adjustment of the tap switch 38. In this regard it will be understood that the tap switch may, and for that matter ordinarily will be adapted for automatic actuation by a suitable relay device, and that the number of resistance sections and switch positions will correspond to the number of positioning tracks 41. Once the tap switch is stepped, there is produced a voltage unbalance or error voltage at the input to the differential amplifier which is adapted to represent the deviation between the desired position of the head bar and its present position. This error voltage is amplifed by the differential amplifier and applied to the control winding of the hydraulic valve as a correction signal. The valve in turn is adapted to initiate movement of the piston, and so also the armature of the differential transformer, to restore the balance between the input voltages to the differential amplifier, or in other words to eliminate the error voltage. When this occurs, the relay coil 51 is deenergized so that the condition of the switch contacts 52 and 53 becomes opposite to that shown in the drawing.

Owing to inherent sensitivity limitation of the differential transformer, the head bar will not ordinarily be caused to assume the newly selected position with the desired degree of accuracy. Instead, the head bar merely assumes a position sufficiently close to it, that the right hand track 41 is in position to be sensed by the heads 15 and 15'.

Depending upon the position assumed by the head bar, one of the heads 15 and 15' will be more nearly centered with respect to the right hand track 41 than the other. This is because the heads 15 and 15' are equally and oppositely spaced from a point on the head bar that coincides axially with the center of the track 41 when the desired positions of the heads 14 are obtained. As a consequence, the amplitudes of the positioning signals on the track 41, as reproduced by the heads 15 and 15', will be unequal causing an input signal to be applied to the detector 39. The amplitude of the signal represents the extent of this amplitude difference, and the phase of the signal represents its sense. By means of detector 39 this information is translated into an error voltage of like character as that produced by detector 33, and by means of the switch contacts 52, this error voltage is applied to the input terminals of the differential amplifier. The result is that a new correction signal is produced by the differential amplifier and applied to the valve which in turn is adapted to initiate movement of the piston in a direction to reduce the error voltage until once again a null balance is obtained. With the system in balance, heads 15 and 15' will be axially displaced from center track 41 by equal amounts on opposite sides, which is the condition corresponding to the information heads 14 being correctly positioned with respect to their corresponding tracks 42. Relay coil 51 remains de-energized throughout this second "vernier" adjustment, since it will have been effectively disconnected from the output of the differential amplifier by its own switch contacts 53. When the voltage output of the reference voltage source is changed, however, to initiate a new re-positioning operation, relay coil 51 is reenergized so that switch contacts 52 and 53 revert to their original positions as shown. This reset action is produced by the momentary closure of switch 54 as occurs whenever the value of the reference voltage is changed, and current is momentarily caused to flow through the relay coil 55 by way of capacitor 56. The function of capacitor 57 is to maintain the relay coil 51 energized until the system has completely settled following a "coarse" positional adjustment as is produced with the linear differential transformer 28. This eliminates the possibility of switching over to the heads 15 and 15' prematurely in the event of an overshoot.

Although the individual detectors have been shown as feeding directly the differential amplifier, it will be understood that in accordance with conventional servo-principles a suitable amount of amplification may be provided as desired.

Also, while in the system specifically shown and described the heads are moved and the drum has a fixed axial position, the arrangement could be reversed, with the drum being the movable element subject to position control.

Various modifications of this nature are within the spirit and scope of the invention and will, no doubt, occur to those skilled in the art and therefore, the invention should not be deemed to be limited to what has been illustrated and described in detail by way of example, but rather the invention should be deemed to be limited only by the scope of the appended claims.

What is claimed is:

1. The combination with a magnetic transducer head member, a magnetic drum member having a plurality of tracks of information signals arranged circumferentially thereon and spaced longitudinally of said drum, said head and said drum being mounted for relative to and fro movement parallel to the drum axis between selective positions of cooperative relation of transducers of said head member with different ones of said information signal tracks, and an actuator operatively connected to the movable one of said members to produce said movements thereof in either direction; of an electrically operated control for said actuator responsive to electric impulses of different polarities to cause respectively opposite movements of said movable member by said actuator, a first operating circuit for selectively deriving and applying to said control electric impulses of said different polarities and of amplitude and duration such as to cause said actuator to move said movable member between said selected positions, and a second operating circuit, operative on completion of each operation of said control by said first circuit, for selectively deriving and applying to said control electric impulses of said different polarities and of amplitude and duration such as to cause said actuator to move said movable member in the direction and to the extent required to center said transducers with respect to said information tracks at each selected position.

2. The combination of claim 1 wherein said first operating circuit includes means to provide a first voltage varying as a function of the position of said movable member, means to provide a second, selectively variable voltage, and means for differentiating said voltages and providing an electric impulse corresponding to the difference between said voltages.

3. The combination of claim 2 wherein said second circuit includes means to provide a first voltage of one polarity varying in amplitude as a function of the amount of off-centering of the transducers of said head member in one direction with respect to said information tracks, means to provide a second voltage of opposite polarity to that of said first voltage and varying in amplitude as a function of the amount of off-centering of the transducers of said head member in the opposite direction with respect to said information tracks, and means for differentiating said voltage and providing an electric impulse corresponding to the difference between said voltages.

4. The combination of claim 3 which also includes means for automatically switching said first circuit out of, and second circuit into, operative relation with said control when the electric impulse provided by said first circuit terminates.

5. The combination of claim 1 wherein said actuator is a hydraulic device having a piston linked to produce the positioning movements of said movable member.

References Cited in the file of this patent

UNITED STATES PATENTS

| | | |
|---|---|---|
| 2,537,770 | Livingston | Jan. 9, 1951 |
| 2,590,091 | Devol | Mar. 25, 1952 |
| 2,751,439 | Burton | June 19, 1956 |
| 2,831,180 | Hasbrougk | Apr. 15, 1958 |